US009857648B2

(12) United States Patent
Kim et al.

(10) Patent No.: US 9,857,648 B2
(45) Date of Patent: Jan. 2, 2018

(54) LIQUID CRYSTAL DISPLAY DEVICE AND METHOD FOR MANUFACTURING THE SAME

(71) Applicant: LG Display Co., Ltd., Seoul (KR)

(72) Inventors: Minjoo Kim, Seoul (KR); Soyoung Noh, Gyeonggi-do (KR); Yongil Kim, Chungcheongnam-do (KR); Taehwan Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 131 days.

(21) Appl. No.: 14/501,392

(22) Filed: Sep. 30, 2014

(65) Prior Publication Data
US 2015/0092136 A1 Apr. 2, 2015

(30) Foreign Application Priority Data

Sep. 30, 2013 (KR) .................. 10-2013-0116006

(51) Int. Cl.
*G02F 1/1343* (2006.01)
*G02F 1/1362* (2006.01)
(52) U.S. Cl.
CPC .. *G02F 1/136227* (2013.01); *G02F 1/134363* (2013.01); *G02F 2001/134372* (2013.01)
(58) Field of Classification Search
CPC ................................. G02F 1/134363
See application file for complete search history.

(56) References Cited

U.S. PATENT DOCUMENTS

| 8,669,557 | B2 | 3/2014 | Kwack et al. |
| 8,730,442 | B2 | 5/2014 | Taniguchi et al. |
| 8,860,028 | B2 | 10/2014 | Kwack |
| 8,913,220 | B2 | 12/2014 | Kim et al. |
| 9,383,612 | B2 | 7/2016 | Huh et al. |
| 2009/0040442 | A1* | 2/2009 | Tanno ............... G02F 1/133555 349/114 |

(Continued)

FOREIGN PATENT DOCUMENTS

| CN | 101893795 A | 11/2010 |
| CN | 102445802 A | 5/2012 |

(Continued)

OTHER PUBLICATIONS

Chinese Office Action, dated Dec. 5, 2016, for the corresponding Chinese patent application No. 201410502890.6.

*Primary Examiner* — Phu Vu
(74) *Attorney, Agent, or Firm* — Morgan, Lewis & Bockius LLP (57) ABSTRACT

A disclosed liquid crystal display includes a substrate with a gate electrode, a gate insulation film, an active layer, a source electrode, a drain electrode, and a first passivation film formed on the substrate. An organic insulation film having a first contact hole and a common electrode having a second contact hole are formed on the first passivation film using a single mask. The display also includes a second passivation film on the common electrode, and a pixel electrode on the second passivation film and connected to the drain electrode via the contact hole through the second passivation film. The top surface of the organic insulation film adjacent to a side edge of the organic insulation film is uncovered by the common electrode.

23 Claims, 10 Drawing Sheets

(56) References Cited

U.S. PATENT DOCUMENTS

| | | | |
|---|---|---|---|
| 2010/0296019 A1* | 11/2010 | Taniguchi | G02F 1/134336 349/44 |
| 2011/0111543 A1 | 5/2011 | Ono | |
| 2012/0086881 A1 | 4/2012 | Kim et al. | |
| 2012/0280237 A1 | 11/2012 | Kwack et al. | |
| 2013/0087794 A1* | 4/2013 | Kwack | H01L 27/1288 257/59 |
| 2014/0028942 A1* | 1/2014 | Takeuchi | G02F 1/136227 349/43 |
| 2014/0152934 A1* | 6/2014 | Huh | G02F 1/133707 349/43 |

FOREIGN PATENT DOCUMENTS

| | | |
|---|---|---|
| CN | 102769013 A | 11/2012 |
| CN | 102998852 A | 3/2013 |
| CN | 103033999 A | 4/2013 |
| CN | 103852942 A | 6/2014 |

\* cited by examiner

FIG. 1A

-RELATED ART-

FIG. 1B

-RELATED ART-

FIG. 1C

-RELATED ART-

-RELATED ART-

FIG. 1F

-RELATED ART-

LIQUID CRYSTAL DISPLAY DEVICE AND METHOD FOR MANUFACTURING THE SAME

This application claims the priority benefit of Korean Patent Application No. 10-2013-0116006 filed in Korea on Sep. 30, 2013, which is incorporated by reference for all purposes as if fully set forth herein.

BACKGROUND OF THE INVENTION

Field of the Invention

The present invention relates to a liquid crystal display and a method for manufacturing the same, and more particularly, to an in-plane switching liquid crystal display and a method for manufacturing the same which can shorten takt time and increase productivity by reducing the number of masks.

Discussion of the Related Art

A liquid crystal display is generally driven using optical anisotropy and polarization properties of liquid crystals. Because the liquid crystals have an elongated shape, liquid crystal molecules have an alignment orientation. The alignment orientation of the liquid crystal molecules may be controlled by applying an electric field to the liquid crystals. Thus, when the alignment orientation of the liquid crystal molecules is adjusted, the alignment of the liquid crystal molecules may be changed. Light is refracted in the alignment orientation of the liquid crystal molecules by the optical anisotropy, thereby displaying image information.

An active matrix liquid crystal display (AMLCD) (hereinafter abbreviated to "liquid crystal display"), in which thin film transistors and pixel electrodes connected to the thin film transistors are arranged in a matrix form, has attracted much attention because of its excellent resolution and ability to display moving pictures. The liquid crystal display includes a color filter substrate on which common electrodes are typically formed, an array substrate on which the pixel electrodes are formed, and liquid crystals interposed between the color filter substrate and the array substrate. In a typical liquid crystal display, the common electrodes and the pixel electrodes drive the liquid crystals by vertically applying an electric field, which provides for good transmittance and a good aperture ratio, among other things. However, the driving of liquid crystal with the vertically applied electric field is disadvantageous in that it does not provide for good viewing angle characteristics. Thus, in order to overcome the shortcomings, an in-plane switching liquid crystal display having improved viewing angle characteristics has been proposed.

FIGS. 1A to 1F are cross-sectional views showing a related art method for manufacturing an in-plane switching liquid crystal display.

Figure 1A:
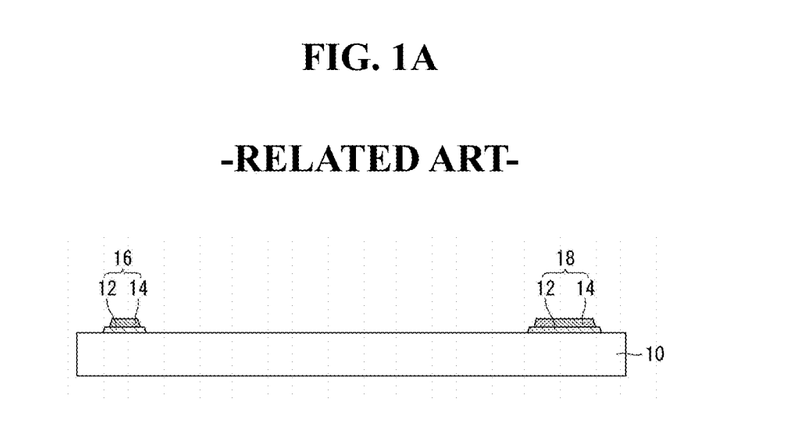
FIGS. 1A to 1F are cross-sectional views showing process stages of a related art method for manufacturing an in-plane switching liquid crystal display.
Figure 1B:
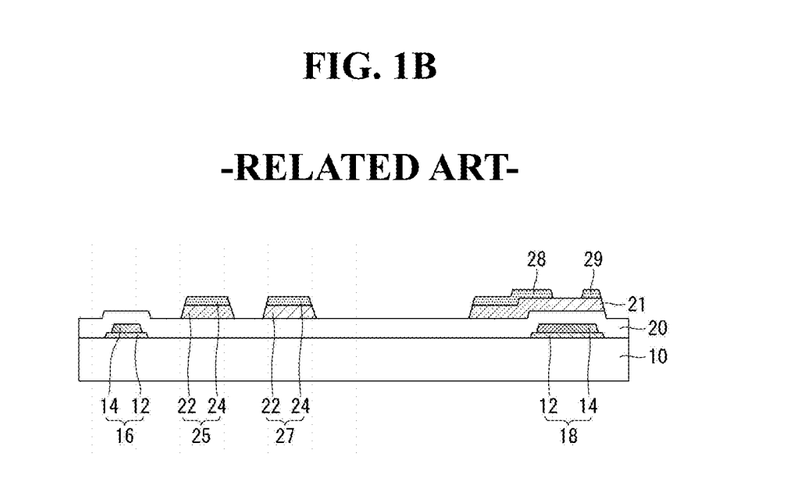
Figure 1C:
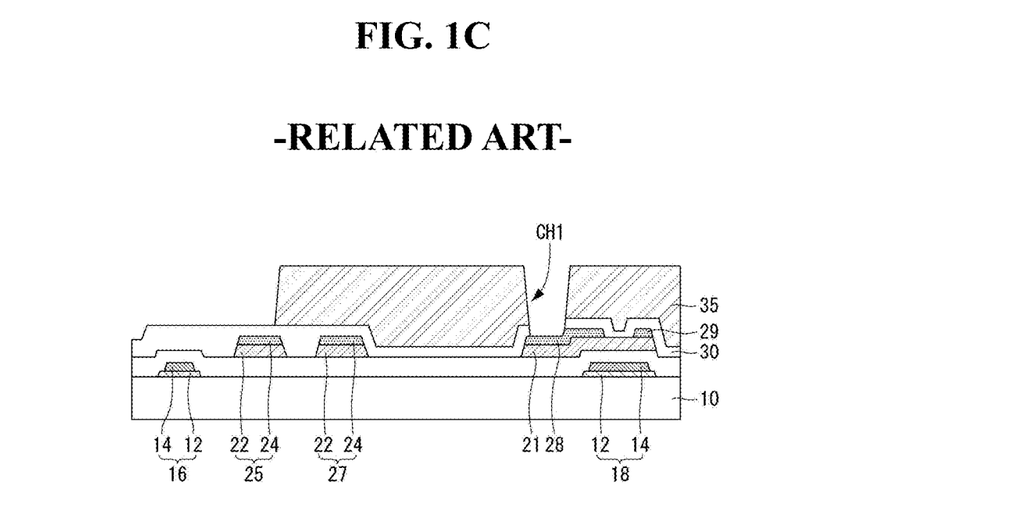

As shown in FIG. 1A, a gate pad electrode 16 and a gate electrode 18 are formed by laminating a transparent conductive layer 12 and a metal layer 14 on a substrate 10 and patterning them using a first mask. Next, as shown in FIG. 1B, a gate insulation film 20 is laminated on the substrate 10. Then, an active layer 21, a source electrode 28, a drain electrode 29, a data pad electrode 25, and a data line 27 are formed by laminating an active layer 22 and a metal layer 24 on the gate insulation film 20, and patterning them using a second mask. Next, as illustrated in FIG. 1C, a first passivation film 30 is deposited on the substrate 10 and is patterned using a third mask. Then, an organic insulation film 35 is deposited on the passivation film 30 and is patterned using a fourth mask to form a first contact hole CH1 exposing the drain electrode 28.

Figure 1D:
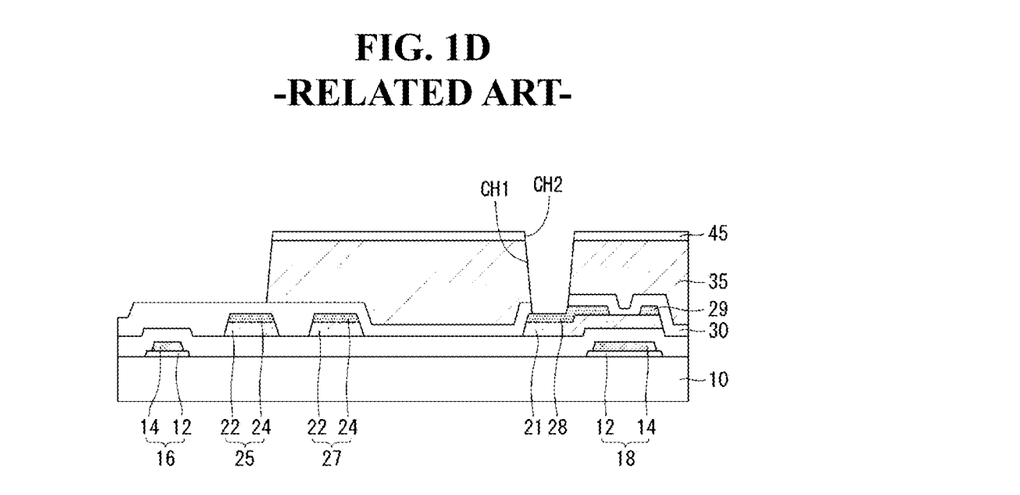
Figure 1E:
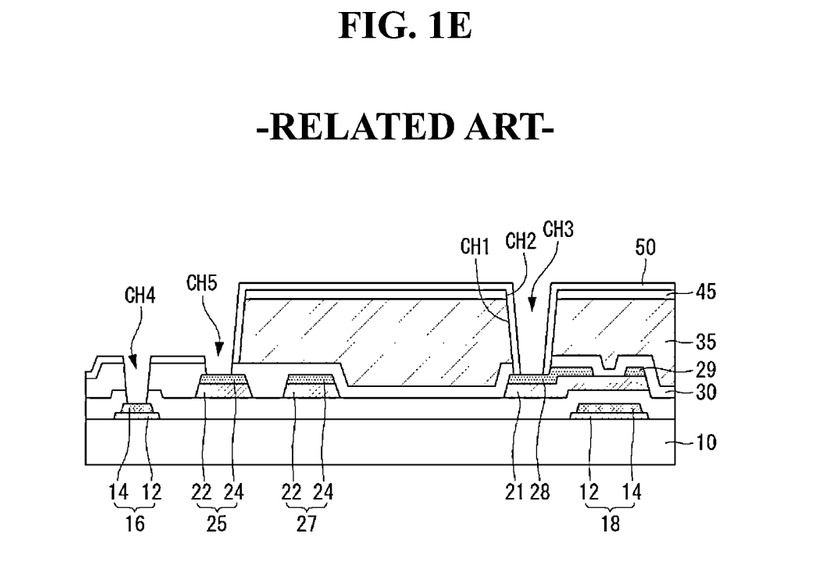

Next, as shown in FIG. 1D, a common electrode 45 is formed by laminating a transparent conductive material on the organic insulation film 35 and patterning it using a fifth mask to form a second contact hole CH2 exposing the drain electrode 28. Next, as shown in FIG. 1E, a second passivation film is formed on the substrate 10 and is patterned using a sixth mask to form a third contact hole CH3 exposing the drain electrode 28, a fourth contact hole CH4 exposing the gate pad electrode 16, and a fifth contact hole CH5 exposing the data pad electrode 27.

Figure 1F:
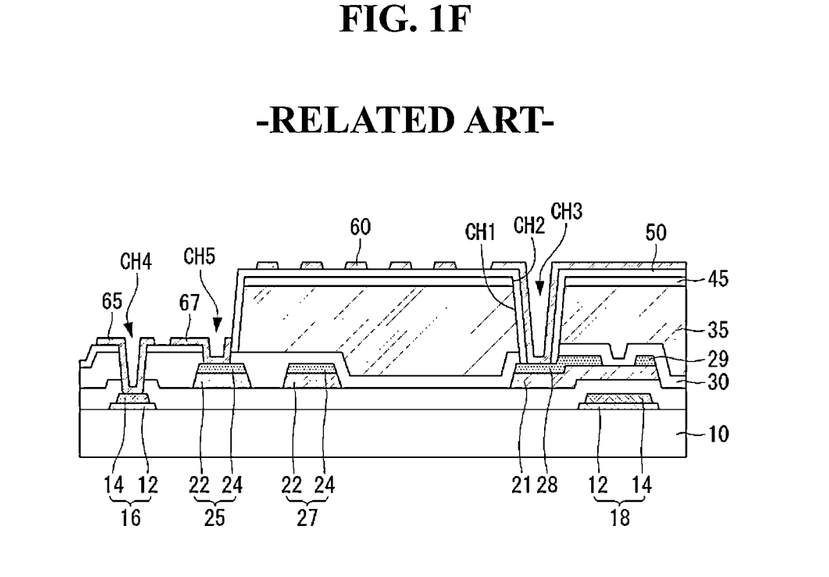

Lastly, as illustrated in FIG. 1F, a pixel electrode 60 connected to the drain electrode 28, a gate pad 65 connected to the gate pad electrode 16, and a data pad 67 connected to the data pad electrode 25 are formed by laminating a transparent conductive material on the substrate 10 and patterning it using a seventh mask.

With the use of a total of seven masks, the above-described related art method for manufacturing a liquid crystal display has a problem of low productivity because of the higher manufacturing costs and longer takt times associated with a relative high number of masks. Also, the high number of mask processes may lead to a higher percentage of manufacturing defects, thus potentially resulting in a lower yield, a higher manufacturing cost, and a decrease in the performance of the finished products.

SUMMARY OF THE INVENTION

Accordingly, the present invention is directed to a liquid crystal display and a method for manufacturing the same that substantially obviate one or more of the problems due to limitations and disadvantages of the related art.

An object of the present invention is to provide a method for manufacturing a liquid crystal display which can shorten the takt time and increase productivity by reducing the number of masks used to manufacture the liquid crystal display.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display includes: a gate electrode on a substrate; a gate insulation film on the gate electrode; an active layer, a source electrode, and a drain electrode on the gate insulation film; a first passivation film on the active layer, the source electrode, and the drain electrode; an organic insulation film on the first passivation film; a first contact hole through the organic insulation film and over the drain electrode; a common electrode on the organic insulation film; a second contact hole through the common electrode and over the drain electrode; a second passivation film on the common electrode and the organic insulation film; and a pixel electrode on the second passivation film and connected to the drain electrode, wherein a top surface of the organic insulation film adjacent to a side edge of the organic insulation film is uncovered by the common electrode.

In another aspect, a liquid crystal display includes: a gate electrode on a substrate; a gate insulation film on the gate electrode; an active layer, a source electrode, and a drain electrode on the gate insulation film; a first passivation film on the active layer, the source electrode, and the drain electrode; an organic insulation film on the first passivation film, the organic insulation film having a first contact hole above the drain electrode; a common electrode on the organic insulation film, the common electrode having a second contact hole above the drain electrode; a second passivation film on the organic insulation film and the common electrode; and a pixel electrode on the second passivation film connected to the drain electrode, wherein the first contact hole and the second contact hole are formed using a single mask.

In yet another aspect, a method for manufacturing a liquid crystal display includes: forming a gate electrode on a substrate using a first mask; forming a gate insulation film on the gate electrode and the substrate; forming an active layer, a source electrode, and a drain electrode on the gate insulation film using a second mask; forming a first passivation film on the substrate, including on the active layer, source electrode, and drain electrode; forming an organic insulation film and a common electrode on the first passivation film using a third mask; forming a second passivation film on the substrate; and forming a pixel electrode on the second passivation film to connect the pixel electrode to the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXAMPLE EMBODIMENTS

Reference will now be made in detail to embodiments of the present invention, examples of which are illustrated in the accompanying drawings. Wherever possible, the same reference numbers will be used throughout the drawings to refer to the same or like parts. Detailed description of known art may be omitted if the art can mislead the embodiments of the invention.

Figure 2:
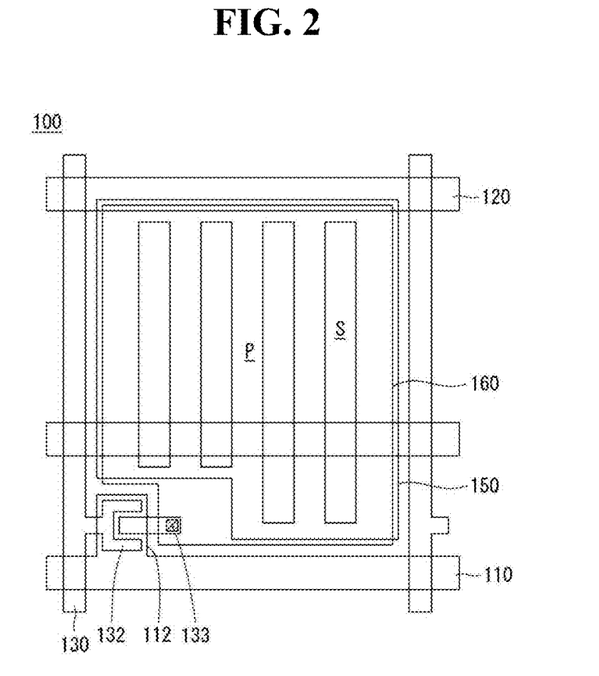
FIG. 2 is a top plan view showing an in-plane switching liquid crystal display according to one example embodiment of the present invention.
Figure 3:
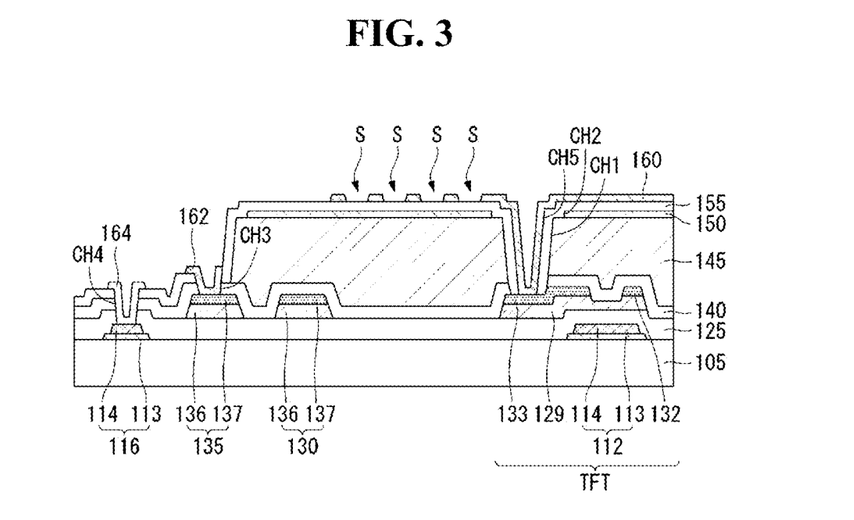
FIG. 3 is a cross-sectional view showing an in-plane switching liquid crystal display according to one example embodiment of the present invention.

FIG. 2 is a top plan view showing an in-plane switching liquid crystal display according to one example embodiment of the present invention. FIG. 3 is a cross-sectional view showing an in-plane switching liquid crystal display according to one example embodiment of the present invention.

As shown in FIG. 2, the in-plane switching liquid crystal display according to the example embodiment of the present invention comprises a gate line 110 arranged in one direction on a substrate (not shown), a common line 120 arranged in parallel with and adjacent to the gate line 110, and a data line 130 crossing the gate line 110 to define a plurality of subpixels P. A gate electrode 112 extending from the gate line 110, a source electrode 132 extending from the data line 130, and a drain electrode 133 spaced apart from the source electrode 132 are formed in the subpixel P at the crossing of the gate line 110 and the data line 130.

A pixel electrode 160 connected to the drain electrode 133 and overlapping the common line 120 is formed within the subpixel P. The pixel electrode 160 may be in the shape of a plate having one or more slits S within the subpixel P. The pixel electrode 160 overlapping the common line 120 constitutes a storage capacitor Cst together with the common line 120. A common electrode 150 overlaps the pixel electrode 160 of the subpixel P. The common electrode 150 is connected to the common line 120 and may have a plate-like shape. The liquid crystal display 100 according to this example embodiment drives liquid crystals by forming horizontal and vertical electric fields between the pixel electrode 160 and the common electrode 150.

More specifically, the structure of an in-plane switching liquid crystal display according to one example embodiment of the present invention will be described below with reference to FIG. 3.

As illustrated in FIG. 3, in the in-plane switching liquid crystal display according to the example embodiment of the present invention, a gate electrode 112 and a gate pad electrode 116 are formed on a substrate 105. The gate electrode 112 and the gate pad electrode 116 may be made up of two layers—a transparent conductive layer 113 and a first metal layer 114. The transparent conductive layer 113 may be made of a material selected from the group consisting of ITO, IZO, and ITZO, and the first metal layer 114 may be made of a material selected from the group consisting of aluminum Al, chrome Cr, molybdenum Mo, copper Cu, gold Au, and titanium Ti.

A gate insulation film 125 is formed on the gate electrode 112 and the gate pad electrode 116 to insulate them, and an active layer 129 is formed on the gate insulation film 125. A source electrode 132 and a drain electrode 133 are formed on and connected to the active layer 129, and a data line 130 and a data pad electrode 135 are formed at one side. The data line 130 and the data pad electrode 135 may be made up of two layers—a semiconductor layer 136 and a second metal layer 137. The semiconductor layer 136 may be made of a material selected from the group consisting of amorphous silicon, polycrystalline silicon, and metal oxide. The second metal layer 137 may be made of a material selected from the group consisting of aluminum Al, chrome Cr, molybdenum Mo, copper Cu, gold Au, and titanium Ti. Accordingly, the active layer 129, the source electrode 132, the drain electrode 133, and the gate electrode 110 constitute a thin film transistor TFT.

A first passiviation film 140 is formed on the entire surface of the substrate 105, including on the thin film transistor TFT, and an organic insulation film 145 is formed on the first passivation film 140. A first contact hole CH1 is formed in the first passivation film 140 and the organic insulation film 145 to expose a portion of the drain electrode 133. A common electrode 150 is formed on the organic insulation film 145. The common electrode 150 may have a plate-like shape and has a second contact hole CH2 exposing the portion of the drain electrode 133 exposed by the first contact hole CH1. The common electrode 150 may be over-etched during the manufacturing process so as to expose a portion of the top surface of the organic insulation film 145 near the side edges of the organic insulation film 145, e.g., the side edges near the first contact hole. The common electrode 150 is a light-transmissive transparent electrode which may be made of a material selected from the group consisting of ITO, IZO, and ITZO. A second passivation film 155 is formed over the entire substrate 105 to insulate the common electrode 150. A pixel electrode 160, a data pad 162, and a gate pad 164 are formed on the second passivation film 155. The pixel electrode 160, data pad 162, and gate pad 164 are transparent electrodes, like the common electrode 150, which may be made of one or more materials selected from the group of ITO, IZO, and ITZO. The data pad 162 is connected to a data pad electrode 135 via a third contact hole CH3 through the first passivation film 140 and the second passivation film 155. The gate pad 164 is connected to a gate pad electrode 116 via a fourth contact hole CH4 through the gate insulation film 125, the first passivation film 140, and the second passivation film 155. Also, the pixel electrode 160 is connected to the drain electrode 133 via a fifth contact hole CH5 through the second passivation film 155 to expose the portion of the drain electrode 133 exposed by the first contact hole CH1 and the second contact hole CH2. The pixel electrode 160 may have one or more slits S. Accordingly, the pixel electrode 160 and the common electrode 150, placed above and below one another, form horizontal and vertical electric fields.

Hereinafter, a method for manufacturing an in-plane switching liquid crystal display according to one example embodiment of the present invention will be described below. In the following description, a method for manufacturing an in-plane switching liquid crystal display according to the above-described structure of FIG. 3 will be taken as an example.

FIGS. 4A to 4G are cross-sectional views showing process stages of a method for manufacturing an in-plane switching liquid crystal display according to an example embodiment of the present invention.

Figure 4A:
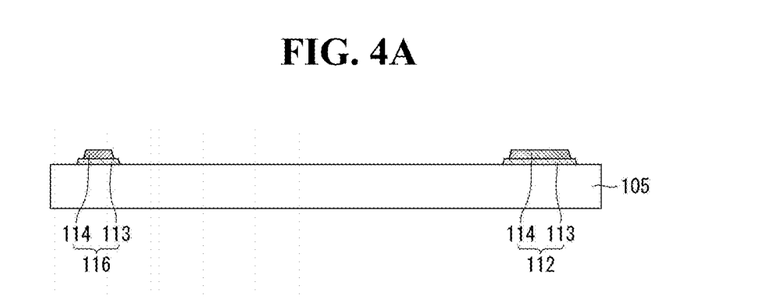
FIGS. 4A to 4G are cross-sectional views showing process stages of a method for manufacturing an in-plane switching liquid crystal display according to an example embodiment of the present invention.

As shown in FIG. 4A, in the method for manufacturing an in-plane switching liquid crystal display according to one example embodiment of the present invention, a transparent conductive material, for example, a material selected from the group consisting of ITO, IZO, and ITZO, and a metal material having low resistance characteristics, for example, one selected from the group consisting of aluminum Al, aluminum alloy, copper Cu, copper alloy, chrome Cr, molybdenum Mo, titanium Ti, and gold Au, are sequentially deposited on a substrate 105. Then, a gate electrode 112 and a gate pad electrode 116, each made up of a transparent conductive layer 113 and a first metal layer 114, are formed by patterning the transparent conductive material and the metal material using a first mask. The transparent conductive material and the metal material are patterned to form the gate electrode 112 and the gate pad electrode 116 concurrently. It should be noted that, while in this example embodiment, the transparent conductive layer 113 is placed below the first metal layer 114, the transparent conductive layer 113 may alternatively be placed above the first metal layer 114.

Figure 4B:
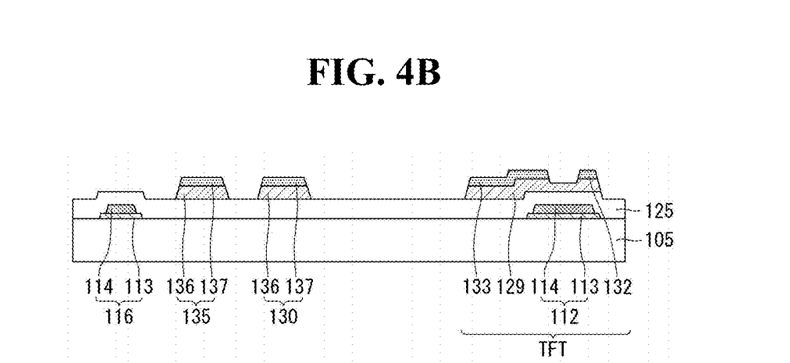

Next, as shown in FIG. 4B, a gate insulation film 125 is formed by depositing an inorganic insulation material, for example, silicon oxide SiOx or silicon nitride SiNx, on the substrate 105, including over the gate electrode 112 and the gate pad electrode 116. Subsequently, amorphous silicon, polycrystalline silicon, which is obtained by crystallization of amorphous silicon, or metal oxide is deposited on the gate insulation film 125. Then, a metal material having low resistance characteristics, for example, one selected from the group consisting of aluminum Al, aluminum alloy, copper Cu, copper alloy, chrome Cr, molybdenum Mo, and titanium Ti, is deposited on top of the deposited amorphous silicon, polycrystalline silicon, or metal oxide. The amorphous silicon, polycrystalline silicon, or metal oxide, and the metal material are simultaneously patterned using a second mask thereby forming an active layer 129, a source electrode 132, a drain electrode 133, a data line 130, and a data pad electrode 135. The second mask may be a half-tone mask. The data line 130 and the data pad electrode 135 are each formed of two layers—a semiconductor layer 136 and a second metal layer 137. Although the active layer 129, source electrode 132, and drain electrode 133 are diffractively exposed and therefore different in size, the active layer 129 is formed of a single layer of the semiconductor layer 136, and the source electrode 132 and the drain electrode 133 are each formed of a single layer of the second metal layer 137. Accordingly, the gate electrode 112, the active layer 129, the source electrode 132, and the drain electrode 133 constitute a thin film transistor TFT.

Figure 4C:
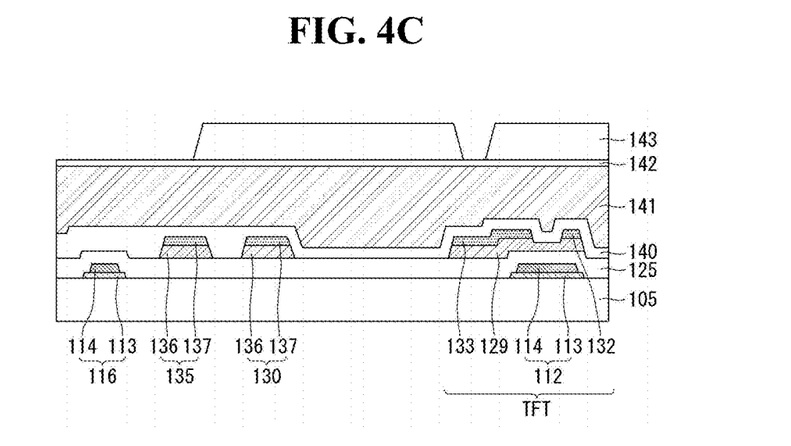

Next, as shown in FIG. 4C, a first passivation film 140 is formed by depositing an inorganic insulation material, for example, silicon oxide SiOx or silicon nitride SiNx, on the entire surface of the substrate 105, including where the thin film transistor TFT is formed. Subsequently, an organic film 141 is formed by applying an organic insulation material to the entire surface of the substrate 105 over the first passivation film 140. The organic film 141 may be made of, for example, one material selected from the group consisting of photo acryl PAC, polystylene, polymethylmetacrylate (PMMA), polyacrylonitrile (PAN), polyamide, polyimide, polyacrylethere, heterocyclic polymer, parylene, fluorine polymer, epoxy resin, benzocyclobutene based resin, siloxane based resin, and silane resin, but is not limited to them. Any organic insulation material can be used for the organic film 141 as long as it is highly transparent and has a low-dielectric quality. Next, a transparent electrode layer 142 is formed by depositing a transparent conductive material on the entire surface of the substrate 105 over the organic film 141. The transparent electrode layer 142 may be made of one or more materials selected from the group consisting of ITO, IZO, and ITZO. Next, a photoresist pattern 143 is formed by applying a photoresist PR on the substrate 105 where the transparent electrode layer 142 is formed and patterning the photoresist using a third mask to expose portions of the transparent electrode layer 142. The photoresist pattern 143 remains where a common electrode is to be formed from the transparent electrode layer 142.

Figure 4D:
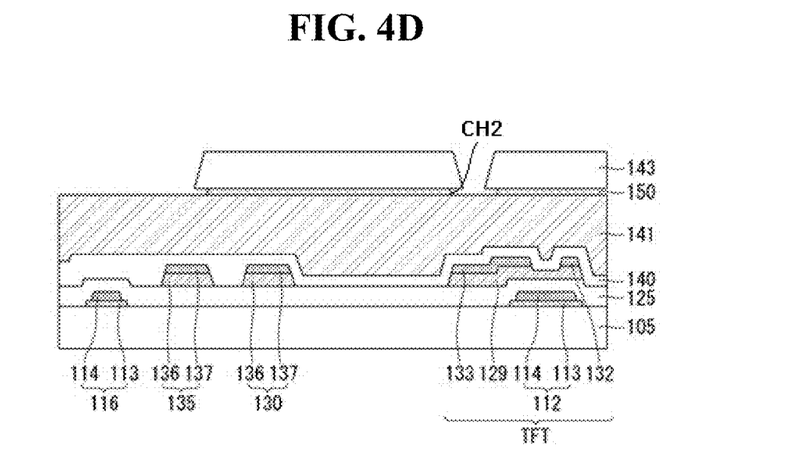

Next, as shown in FIG. 4D, a common electrode 150 may be formed by wet-etching the exposed part of the transparent electrode layer 142 using the photoresist pattern 143 as a mask. The wet etching characteristics can result in over-etching the transparent electrode layer 142 underneath the edges of the photoresist pattern 143 so that the photoresist pattern 143 has an overhang above the resulting common electrode 150. Thus, the third mask should be designed, and the photoresist pattern 143 should be formed, taking this over-etching during the wet etching process into consideration. Moreover, a second contact hole CH2 is formed in the common electrode 150 over the drain electrode 133 of the thin film transistor TFT.

Figure 4E:
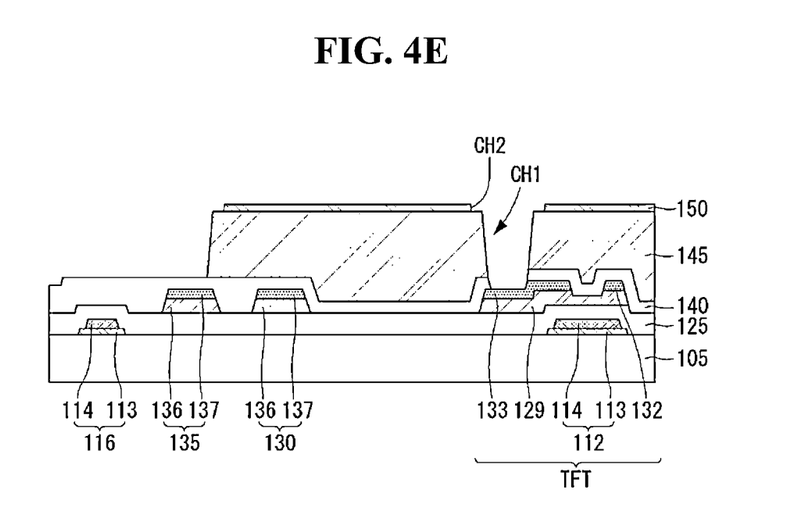

Next, as shown in FIG. 4E, upon completion of the wet etching process, an organic insulation film 145 is formed by dry-etching the exposed part of the organic film 141 using the photoresist pattern 143 as a mask. It may be difficult to selectively dry-etch only the organic film 141. Accordingly, the exposed part of the organic film 141 may be partly left or the first passivation film 140 below it also may be at least partly etched. Any portion of the exposed part of the organic film 141 and the first passivation film 140 below it may be etched at a later process to expose a part of the drain electrode 133. Also, dry-etching the organic film 141 may cause the common electrode 150 located above the organic film 141 to be etched in a reverse tapered shape if the common electrode 150 is not over-etched during the preceding wet etching process. Thus, the common electrode 150 may be over-etched during the wet-etching so that the common electrode 150 has a forward tapered shape. Also, if the common electrode 150 is over-etched, it exposes a portion of the top surface of the organic insulation film 145 near the side edges of the organic insulation film 145, as shown in FIG. 4E. Upon drying etching of the organic film 141, a first contact hole CH1 is formed in the organic insulation film 145 over the drain electrode 133 of the thin film transistor TFT. Also, the drying etching exposes the pad portion where the gate pad electrode 116 and the data pad electrode 135 are located. Upon completion of both of the aforementioned wet-etching and dry-etching processes, the photoresist pattern 143 is stripped out. Accordingly, the common electrode 150 is formed by wet-etching the transparent electrode layer 142, and the organic insulation film 145 is formed by dry-etching the organic film 141.

Figure 4F:
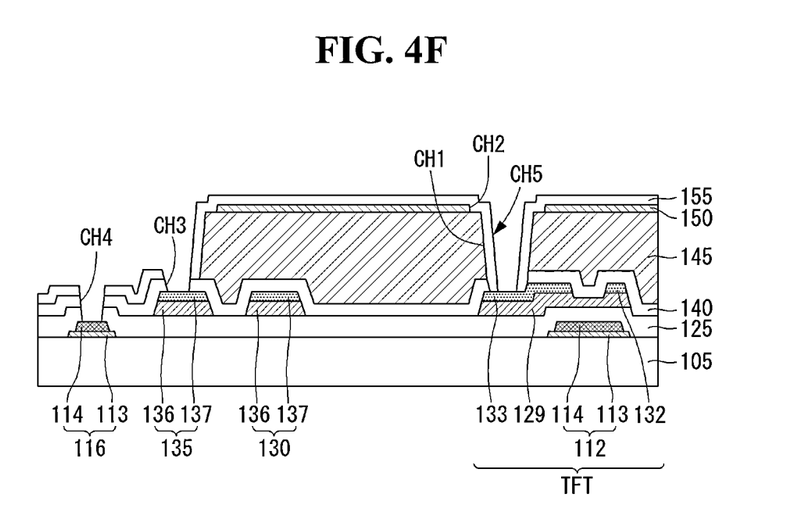

Next, as shown in FIG. 4F, a second passivation film 155 is formed by depositing an inorganic insulation material, for example, silicon oxide SiOx or silicon nitride SiNx, over the substrate 105, including where the common electrode 150 and the organic insulation film 145 are formed. Subsequently, the second passivation film 155 and the first passivation film 140 are dry-etched using a fourth mask to form a third contact hole CH3 exposing the data pad electrode 135, a fourth contact hole CH4 exposing the gate pad electrode 116, and a fifth contact hole CH5 exposing the drain electrode 133 of the thin film transistor TFT. Any portion of the organic insulation film 145 and the first pasisvation film 140 left below the first contact hole CH1 after the previous mask process are etched so as to expose the drain electrode 133. When forming the fourth contact hole CH4, the gate insulation film 125 also is dry-etched to expose the gate pad electrode 116.

Figure 4G:
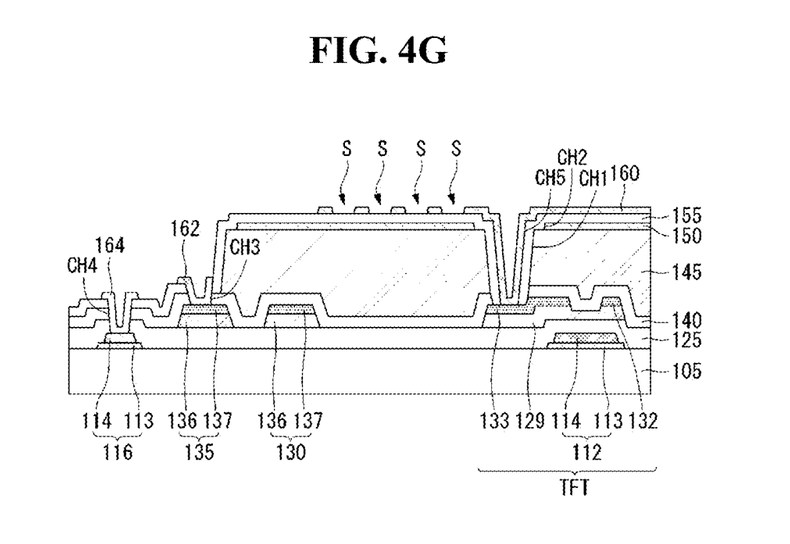

Next, as shown in FIG. 4G, a pixel electrode 160, a data pad 162, and a gate pad 164 are formed by depositing a transparent conductive material, one selected from the group consisting of ITO, IZO, and ITZO, on the entire surface of the substrate 105, including where the third to fifth contact holes CH3, CH4, and CH5 are formed, and patterning it using a fifth mask. The pixel electrode 160 may have one or more slits S and is connected to the drain electrode 133 of the thin film transistor TFT via the fifth contact hole CH5. Moreover, the data pad 162 is connected to the data pad electrode 135 via the third contact hole CH3, and the gate pad 164 is connected to the gate pad electrode 116 via the fourth contact hole CH4. Accordingly, the array substrate of the liquid crystal display 100 according one example embodiment of the present invention is fabricated.

As detailed above, the array substrate of the in-plane switching liquid crystal display according to one example embodiment of the present invention may be manufactured using a total of five masks, which is two fewer than the seven masks used in the related art display. Accordingly, it can increase the productivity of the liquid crystal display device by shortening the takt time of a liquid crystal display manufacturing process, reducing manufacturing costs, reducing the manufacturing defects, and increasing the production yield.

Figure 5A:
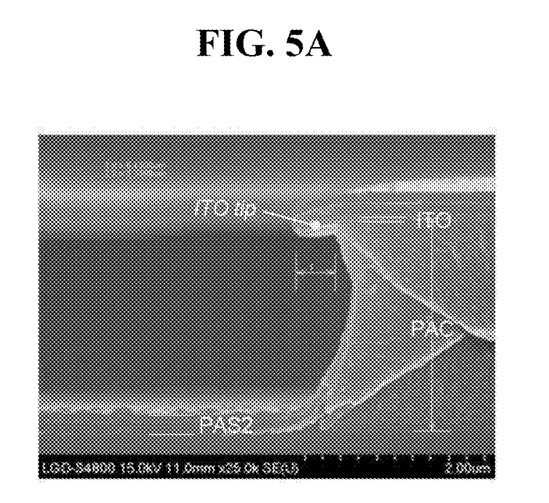
FIGS. 5A and 5B are SEM images respectively showing first and second contact hole portions of a liquid crystal display manufactured according to a comparative example of the present invention.
Figure 5B:
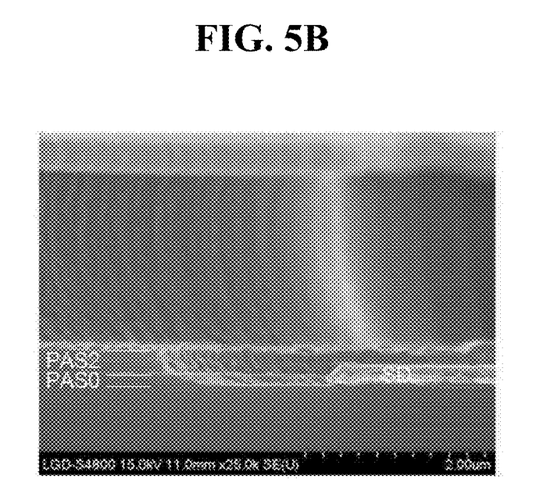
Figure 6A:
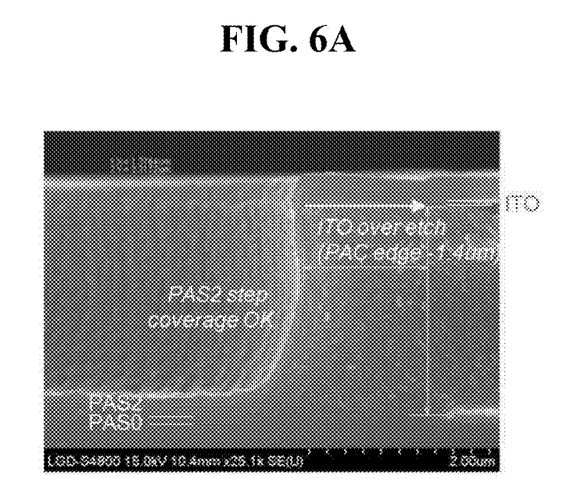
FIGS. 6A and 6B are SEM images respectively showing first and second contact hole portions of a liquid crystal display manufactured according to an example embodiment of the present invention.
Figure 6B:
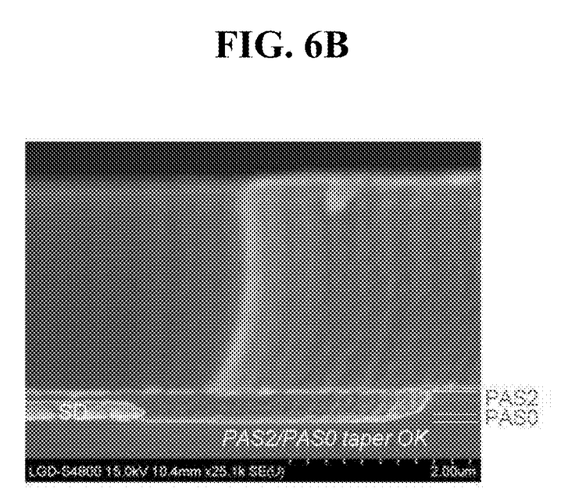

FIGS. 5A and 5B are SEM images showing the first and second contact hole portions of a liquid crystal display manufactured according to a comparative example of the present invention. FIGS. 6A and 6B are SEM images showing the first and second contact hole portions of a liquid crystal display manufactured according to an example embodiment of the present invention.

In the manufacturing process according to the comparative example of the present invention, the common electrode and the second contact hole are formed without over-etching the transparent electrode layer, and then the organic insulation film and the first contact hole are formed by wet-etching the organic film. On the other hand, in the example embodiment of the present invention, the common electrode and the second contact hole are formed by over-etching the transparent electrode layer.

As shown in FIGS. 5A and 5B, in the liquid crystal display manufactured according to the comparative example of the present invention, the common electrode indicated as ITO has a reverse tapered shape with its tip protruding out into the area of the contact holes. On the other hand, as shown in FIGS. 6A and 6B, in the liquid crystal display manufactured according to the example embodiment of the present invention, the common electrode has a forward tapered shape without an overhang. Instead, the common electrode is overetched so that its edge is recessed from the edge of the underlying passivation film, in this example by approximately 1.4 µm. In other words, in the example embodiment of the present invention, the second contact hole through the common electrode is larger than the first contact hole through the organic insulation film due to the over-etching of the common electrode. Also, the underlying passivation film has a good step coverage and is tapered well.

It will be apparent to those skilled in the art that various modifications and variations can be made in the liquid crystal display device of the present invention and method of manufacturing the same without departing from the spirit or scope of the invention. Thus, it is intended that the present invention cover the modifications and variations of this invention provided they come within the scope of the appended claims and their equivalents.

What is claimed is:

1. A liquid crystal display, comprising:
    a gate electrode on a substrate;
    a gate insulation film on the gate electrode;
    an active layer, a source electrode, a drain electrode, and a data pad electrode on the gate insulation film;
    a first passivation film on the active layer, the source electrode, the drain electrode, and the data pad electrode;
    an organic insulation film on the first passivation film;
    a first contact hole through the organic insulation film and the first passivation film over the drain electrode;
    a common electrode on the organic insulation film;

a second contact hole through the common electrode and over the drain electrode;

a second passivation film on the common electrode and the organic insulation film; and a pixel electrode on the second passivation film and connected to the drain electrode, wherein a top surface portion of the organic insulation film adjacent to a side edge of the organic insulation film is uncovered by the common electrode, and a side edge of the common electrode adjacent to the side edge of the organic insulation film is recessed from the side edge of the organic insulation film by more than 1 µm, wherein the second passivation film covers a side wall of the organic insulation film and a side wall of the first passivation film in the first contact hole, and wherein the first passivation film and the second passivation film are each on the data pad electrode.

2. The liquid crystal display device of claim 1, further comprising:

a third contact hole through the first passivation film and the second passivation film to expose a portion of the data pad electrode; and a data pad connected to the data pad electrode via the third contact hole.

3. The liquid crystal display device of claim 1, further comprising:

a gate pad electrode on the substrate, wherein the gate insulation film, the first passivation film, and the second passivation film are each on the gate pad electrode;

a fourth contact hole through the gate insulation film, the first passivation film, and the second passivation film, to expose a portion of the gate pad electrode; and a gate pad connected to the gate pad electrode via the fourth contact hole.

4. The liquid crystal display device of claim 1, further comprising:

a fifth contact hole through the second passivation film exposing a portion of the drain electrode, wherein the pixel electrode is connected to the drain electrode via the fifth contact hole.

5. The liquid crystal display device of claim 1, wherein the pixel electrode has at least one slit.

6. A liquid crystal display, comprising:

a gate electrode and a gate pad electrode on a substrate;

a gate insulation film on the gate electrode and the gate pad electrode;

an active layer, a source electrode, and a drain electrode on the gate insulation film;

a first passivation film on the gate insulation film, the active layer, the source electrode, and the drain electrode;

an organic insulation film on the first passivation film, the organic insulation film having a first contact hole above the drain electrode;

a common electrode on the organic insulation film, the common electrode having a second contact hole above the drain electrode;

a second passivation film on the organic insulation film and the common electrode, the second passivation film covering a side wall of the organic insulation film in the first contact hole; and a pixel electrode on the second passivation film connected to the drain electrode, wherein the first contact hole further passes through the first passivation film, and the second passivation film covers a side wall of the first passivation film in the first contact hole, and wherein the first passivation film and the second passivation film are each on the gate pad electrode.

7. The liquid crystal display device of claim 6, wherein a top surface portion of the organic insulation film adjacent to a side edge of the organic insulation film is uncovered by the common electrode.

8. The liquid crystal display device of claim 7, wherein a side edge of the common electrode adjacent to the side edge of the organic insulation film is recessed from the side edge of the organic insulation film by more than 1 µm.

9. A method for manufacturing a liquid crystal display, the method comprising:

forming a gate electrode on a substrate using a first mask;

forming a gate insulation film on the gate electrode and the substrate;

forming an active layer, a source electrode, and a drain electrode on the gate insulation film using a second mask;

forming a first passivation film on the substrate, including on the active layer, the source electrode, and the drain electrode;

forming an organic insulation film and a common electrode on the first passivation film using a third mask;

forming a second passivation film on the substrate; and forming a pixel electrode on the second passivation film to connect the pixel electrode to the drain electrode.

10. The method of claim 9, wherein the forming of the organic insulation film and the common electrode includes:

forming an organic film on the first passivation film;

forming a transparent electrode layer on the organic film;

forming a photoresist pattern on the transparent electrode layer using the third mask;

forming the common electrode by etching the transparent electrode layer using the photoresist pattern as a mask; and forming the organic insulation film by etching the organic film using the photoresist pattern as a mask.

11. The method of claim 10, wherein the forming of the organic insulation film by etching the organic film forms a first contact hole through the organic insulation film and over the drain electrode.

12. The method of claim 10, wherein the forming of the common electrode by etching the transparent electrode layer forms a second contact hole through the common electrode and over the drain electrode.

13. The method of claim 10, wherein the forming of the common electrode by etching the transparent electrode layer includes wet etching the transparent electrode layer using the photoresist pattern as a mask so that the transparent electrode layer is over-etched to form the common electrode.

14. The method of claim 10, wherein the forming of the organic insulation film by etching the organic film includes dry etching the organic film using the photoresist pattern as a mask.

15. The method of claim 9, further comprising:

forming a gate pad electrode concurrently with the gate electrode on the substrate using the first mask; and forming a data pad electrode concurrently with the active layer, the source electrode, and the gate electrode using the second mask, wherein the gate insulation film is formed on the gate pad electrode, and the first passivation film and the second passivation film are each formed on both the gate pad electrode and the data pad electrode.

16. The method of claim 15, wherein the forming of the second passivation film includes forming third, fourth, and fifth contact holes using a fourth mask, wherein the third contact hole goes through the first passivation film and the second passivation film to expose a portion of the data pad electrode, wherein the fourth contact hole goes through the gate insulation film, the first passivation film, and the second passivation film to expose a portion of the data pad electrode, and wherein the fifth contact hole goes through the second passivation film to expose a portion of the drain electrode.

17. The method of claim 16, wherein the forming of the fifth contact hole includes etching at least one of the organic film and the first passivation layer over the drain electrode to expose the portion of the drain electrode.

18. The method of claim 17, wherein the forming of the pixel electrode includes:

forming a transparent conductive material on the second passivation layer; and etching the transparent conductive material using a fifth mask to form a data pad to connect to the data pad electrode via the third contact hole, a gate pad to connect to the gate pad electrode via the fourth contact hole, and the pixel electrode to connect to the drain electrode via the fifth contact hole.

19. The method of claim 9, wherein the organic insulation film and the common electrode are formed so that a top surface portion of the organic insulation film adjacent to a side edge of the organic insulation film is uncovered by the common electrode.

20. The liquid crystal display device of claim 1, wherein the second passivation film covers the entire side wall of the first passivation film in the first contact hole.

21. The liquid crystal display device of claim 6, wherein the second passivation film covers the entire side wall of the first passivation film in the first contact hole.

22. The liquid crystal display device of claim 1, wherein the second passivation film is directly on a top surface of the first passivation film above the data pad electrode.

23. The liquid crystal display device of claim 6, wherein the second passivation film is directly on a top surface of the first passivation film above the gate pad electrode.

* * * * *